Sept. 11, 1945. J. ISAAC 2,384,621

FILM REEL

Filed March 10, 1944

JOSEPH ISAAC
INVENTOR

BY Newton M. Virruos.
J. Griffin Little
ATTORNEYS

Patented Sept. 11, 1945

2,384,621

UNITED STATES PATENT OFFICE 2,384,621

FILM REEL

Joseph Isaac, Rochester, N. Y., assignor to Eastman Kodak Company, Rochester, N. Y., a corporation of New Jersey Application March 10, 1944, Serial No. 525,867

6 Claims. (Cl. 242—74)

The present invention relates to photography, and more particularly to film reels upon which a strip or web of photographic film may be wound.

As is well known, when a film strip is wound onto a reel, the end of the film is usually attached or secured to the hub or core of the reel. Such attaching is often difficult and time consuming, particularly when narrow widths of film are handled. Furthermore, in many types of reels, means for securing the end of the film to the reel hub is so positioned and/or shaped that the film will not be readily disengaged from the reel when the film is unwound therefrom. This arrangement is particularly disadvantageous and undesirable when the film is being rewound after projection. In such rewinding, the film is moved at a relatively high speed, and if the film is not readily released, a pull on the film may cause the end secured to the unwinding reel to be torn or the perforations seriously damaged, the disadvantages of which are apparent to those in the art.

The present invention, therefore, has as its principal object the provision of a film reel which is so designed that the end of the film strip may be readily and quickly attached to the reel hub when the film is wound thereon, but which may also be quickly, easily and effectively disengaged from the reel during the unwinding of the film therefrom without necessitating manual manipulation on the part of the operator.

Another object of the invention is the provision of a reel of the class described in which the securing and releasing of the film is automatic.

Still another object of the invention is the provision of a reel of this type which is simple in construction, relatively inexpensive to manufacture, and highly effective in use.

To these and other ends, the invention resides in certain improvements and combinations of parts, all as will be hereinafter more fully described, the novel features being pointed out in the claims at the end of the specification.

In the drawing.

Similar reference numerals throughout the various views indicate the same parts.

Figure 1:
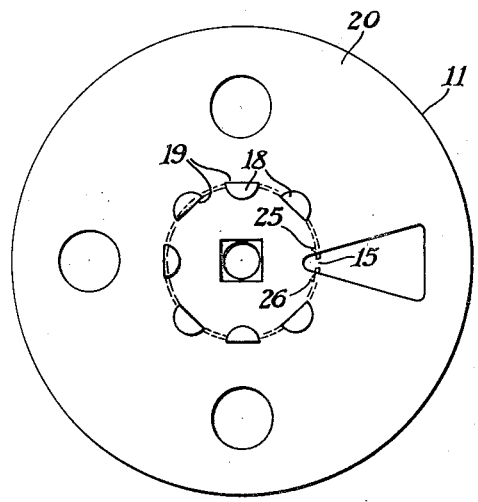
Fig. 1 is a side view of a film reel constructed in accordance with the preferred embodiment of the present invention.
Figure 2:
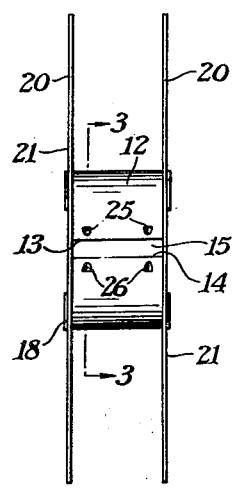
Fig. 2 is a front view of a reel illustrated in Fig. 1.
Figure 3:
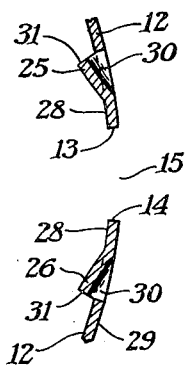
Fig. 3 is a sectional view through the reel hub and taken substantially on line 3—3 of Fig. 2, showing the relation of the film receiving slot and the film engaging and securing lug.
Figure 4:
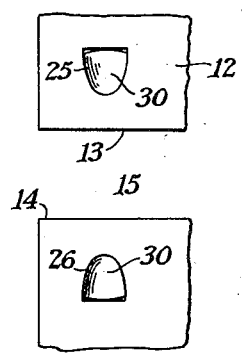
Fig. 4 is a top view of a portion of the hub showing the relation of the slot and film securing lugs.
Figure 5:
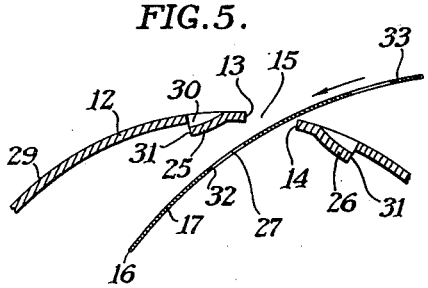
Fig. 5 is a sectional view through a portion of the reel hub showing the relation of the film after the end of the latter has been passed through the slot, but prior to the winding of the film on the reel.

The present invention relates to a film reel broadly indicated by the numeral 11 and provided with a core or hub 12 formed from a strip of sheet material, such as metal, which is rolled up to provide a hollow, tubular member the edges 13 and 14 of which are retained in spaced relation to provide a slot 15 through which the end 16 of the film strip may be inserted, as shown in Fig. 5. The ends of the hubs are provided with axially extending tongues 18 adapted to register with and pass through openings 19 formed in a pair of end flanges 20 which serve to retain the film against lateral movement after being wound on the hub. The projecting ends of the tongues 18 are bent over on the outer faces 21 on the flanges 20 to secure the latter of the hub as is well known. The reel so far described is of well known construction and does not form a part of the present invention.

It is usual practice to first secure or fasten the end of the film to the reel hub and to then wind the film in a series of convolutions on the hub. Various devices have been designed for attaching the film end, but most of these require a certain amount of manual manipulation of the film by the operator to bring the film into position to be secured or attached to the hub. Such manipulation is both undesirable and time consuming, and particularly annoying when the narrow widths of film are handled. To overcome these undesirable features, the present invention provides an arrangement by which the operator merely inserts the end of the film in the slotted hub and then proceeds to wind the film. As soon as such winding is started, the inserted end of the film is automatically moved into engagement with the holding means or lugs carried by the hub to secure the film thereto.

To secure this result, the present invention provides two pairs of lugs, generally indicated by the numerals 25 and 26, and spaced from the edges 13 and 14 respectively, as clearly shown in Figs.

5 and 6, the purpose of which arrangement will be later described. Two distinct pairs of such lugs are provided so that the film may be wound in either direction on the hub 12. However, since each pair of lugs is identical in structure and formation, only one pair will be described in detail, the corresponding parts of the two pairs will be designated by the same numerals.

The lugs 25 are positioned adjacent the end flanges 20 so as to engage in the marginal perforations 27 formed in the film strip. These lugs are also spaced circumferentially of the hub 12 a definite distance 28 from the edge 13, the purpose of which will be later described. While the lugs may be separately formed and secured to the hub 12, they are preferably formed from the material thereof. To this end, the outer surface 29 of the hub has formed therefrom, by punching, shearing, pressing, or other suitable means, the lugs 25 and 26, each of which comprises a U-shaped embossed portion 30 pressed out of the plane of the hub and terminating in a sheared edge 31 positioned below the inner surface of the hub. These embossed portions 30 are adapted to engage in the marginal perforations 27 while the edges 31 engage the ends 32 of the perforations to hold the film against movement. By means of this arrangement, the film securing means or lugs 25 and 26 are formed out of the material of the hub and extend inwardly from the hub and the plane of the slot 15, as is apparent from the drawing.

Figure 6:
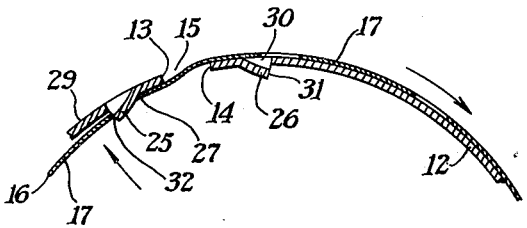
Fig. 6 is a view similar to Fig. 5 but showing the film after the engagement thereof to the reel hub.

Now when the film 17 is to be wound on the reel, the end 16 thereof is first inserted through the slot 15 while the exposed section 33 is out of engagement with the hub 12, as clearly illustrated in Fig. 5. However, as soon as winding begins, the portion 33 is moved into engagement with the hub surface 29. Such movement of the portion 33 from the position shown in Fig. 5 to that shown in Fig. 6 serves to first bring the film into engagement with the edge 14 of the slot 15. Further rightward or clockwise movement of the portion 33 to the position shown in Fig. 6 will pivot the film, like a lever, about the edge 14 which then acts as a fulcrum. It will now be apparent that the movement of the film from the position shown in Fig. 5 to that shown in Fig. 6 will move the end 16 about the fulcrum or pivot 14 to bring a pair of marginal perforations 27 into registry with the lugs 25. Then continued winding of the film will cause the latter to shift slightly to bring the ends 32 of the perforations into holding relation with the sheared edges 31 of the lugs 25, as shown in Fig. 6.

By means of this arrangement, all the operator has to do is merely insert the end 16 of the film 17 through the slot 15 and then wind the film on the hub 12. The initial winding then serves to automatically move or pivot the end 16 to bring the latter into holding or engaging relation with the lugs 25, thus completely eliminating any manual manipulation of the film to engage the latter with the holding lugs. In the arrangement shown, the film is wound to the right and the lugs 25 hold the film, while the edge 14 provides the pivot or fulcrum about which the film end 16 is moved. However, if the film is wound in the opposite direction on the hub, the lugs 26 then serve as the holding means and the edge 13 as a pivot or fulcrum. Thus a film may be wound in either direction on the hub and is automatically attached or secured thereto, the advantages of which are apparent to those in the art.

In addition to securing the film to the reel hub during the winding operation, it is usually necessary to disconnect or disengage the connected end 16 from the hub at the completion of the rewinding operation. Many reels provide effective arrangements for securing the leading end of the film to the hub during the winding operation, but such securing means are so usually shaped and/or positioned as not to permit the ready release or disengagement of the film when the unwinding is completed. As is well known, during the rewinding operation the film is run at a relatively high speed and if care is not exercised, the end of the film may be inadvertently reached before the rewinding speed is reduced and the film end disconnected from the supply reel. However, as the end of the film is secured or connected to the supply reel, the rapid rotation of the take-up reel may place such a strain on the film as to break the latter and/or damage the perforations engaged by the holding lugs 25.

The present reel design overcomes these disadvantages by providing a construction which positively and automatically moves the film out of engagement with the lugs 25 at the completion of the rewinding or unwinding operation to effectively, smoothly and completely disconnect the end 16 from the hub 12.

Figure 7:
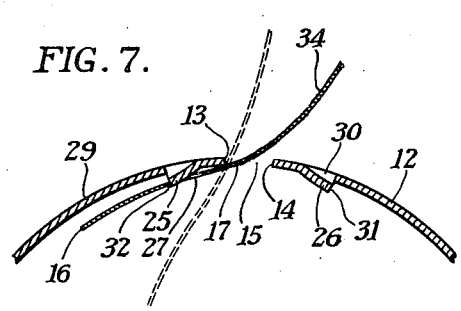
Fig. 7 is a view similar to Figs. 5 and 6 but showing the film during its disengagement thereof from the reel.

It will be readily seen from an inspection of Fig. 7 that when the last convolution of film is being unwound, the film will move away from the hub, as shown at 34, Fig. 7. Further unwinding will cause the film to move to the left and into engagement with the edge 13 adjacent the holding lugs 25. Upon such engagement, the film then again acts as a lever which pivots about the edge 13 which forms a fulcrum or pivot to move the end 16 in a counter-clockwise direction and out of engagement with the lugs 25, as shown in dotted line Fig. 7. Thus the unwinding serves to pivot the film about the edge 13 to rock the film strip as a unit to automatically disengage the end 16. This disengagement besides being automatic is smooth, easy and accomplished without damage to the film strip or the perforations thereof, or without necessitating manual manipulation on the part of the operator. In such disengagement, the edge 13 acts as a pivot or fulcrum. However, if a film strip had been wound on the hub in the opposite direction with the lugs 26 holding the film, then the edge 14 would act as the fulcrum during the disengaging operation, while the edge 13 would act as the fulcrum in the engaging operation. Thus the edge nearest the film or adjacent the lugs in use acts as a disengaging fulcrum, while the other or remote edge acts as a fulcrum during the winding operation.

It will thus be apparent from the above description that the present invention provides a reel to which a film strip may be connected to or disconnected from without necessitating manual manipulation on the part of the operator or without damage to the film strip or the perforations thereof. Furthermore, the engaging and disengaging is automatic. Finally, the structure, although simplicity itself, is highly effective in use, and is relatively inexpensive to manufacture.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. A film reel adapted to receive a strip of perforated film comprising, in combination, a tubular hub, flanges secured to the ends of said hub, said hub being formed with a transversely extending slot through which an end of said film may be inserted, film securing means formed on said hub and spaced from said slot, and an edge on said slot adapted to be engaged by said film and providing a fulcrum therefor for automatically moving said end into engaging relation with said securing means when said strip is wound onto said hub to secure said film to said hub.

2. A film reel adapted to receive a strip of perforated film comprising, in combination, a tubular hub, flanges secured to the ends of said hub, said hub being formed with a transversely extending slot through which an end of said film may be inserted, lugs formed from the material of said hub and extending inwardly therefrom and spaced from one edge of said slot and adapted to engage perforations at said end to secure the latter to said hub, and the other edge of said slot forming a fulcrum engaged by said film as the latter is wound onto said hub for automatically moving said end about said other edge and into holding relation with said lugs.

3. A film reel adapted to receive a strip of perforated film comprising, in combination, a tubular hub, flanges secured to the ends of said hub, said hub being formed with a transversely extending slot through which an end of said film may be inserted, and film engaging lugs projecting inwardly of said hub and spaced from the edge of said slot adjacent said lugs, said edge forming a fulcrum about which said film pivots when unwound from said reel to move said end out of engaging relation with said lugs.

4. A film reel adapted to receive a strip of perforated film comprising, in combination, a tubular hub, flanges secured to the ends of said hub, said hub being formed with a transversely extending slot through which an end of said film may be inserted, a film engaging lug projecting inwardly from said hub and spaced from said slot and adapted to engage a perforation formed in said end, and an edge of said slot engageable by said film to provide a fulcrum about which said film may pivot when wound onto said hub to move said end to bring said perforation into engagement with said lug.

5. A film reel adapted to receive a strip of perforated film comprising, in combination, a tubular hub, flanges secured to the ends of said hub, said hub being formed with a transversely extending slot through which an end of said film may be inserted, a film engaging lug extending inwardly from said hub and spaced from said slot and adapted to engage in a perforation of said end to secure said end to said hub, and an edge of said slot engageable by said film to provide a fulcrum about which said film may pivot when unwound from said reel to automatically disengage said film from said lug.

6. A film reel adapted to receive a strip of perforated film comprising, in combination, a tubular hub, flanges secured to the ends of said hub, said hub being formed with a transversely extending slot through which an end of said film may be inserted, film engaging lugs extending inwardly from said hub and spaced from the edge of said slot adjacent said lugs, said lugs being adapted to engage in perforations formed in said end to secure the latter to said hub, the other edge of said slot forming a fulcrum about which said film will pivot when wound on said hub to automatically move said end toward said lugs so that the latter may engage in said perforations, and said first edge forming a separate fulcrum about which said film may pivot when unwound from said hub to automatically disengage said perforations from said lugs to release said end from said hub.

JOSEPH ISAAC.